(No Model.)
V. P. TRAVERS.
HAMMOCK SPREADER.
No. 381,863. Patented Apr. 24, 1888.
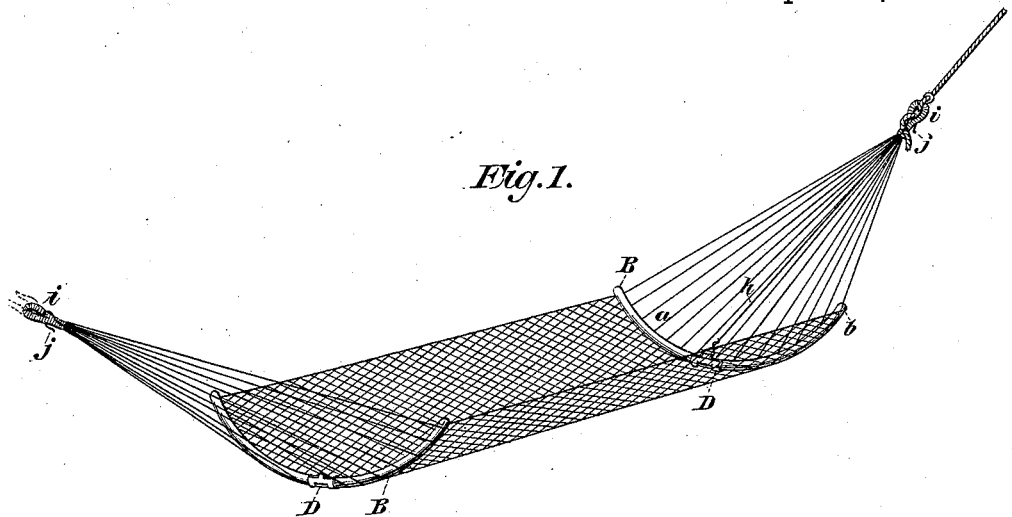
Fig. 1.
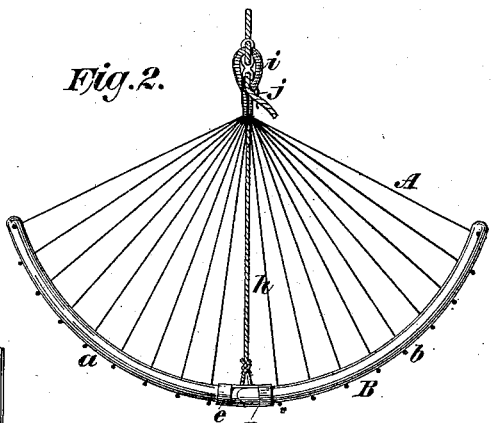
Fig. 2.
Fig. 5.
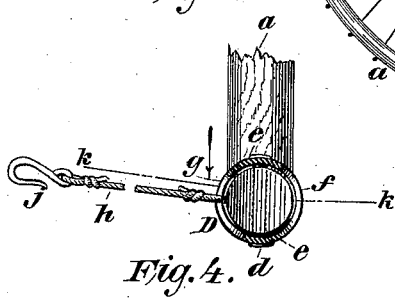
Fig. 4.
Fig. 3.
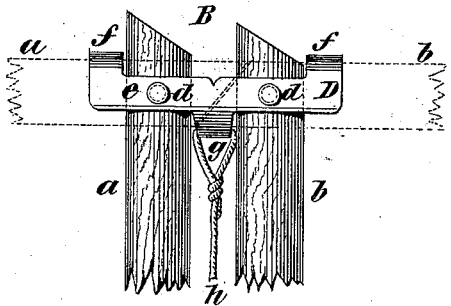
WITNESSES:
Gustave Dieterich
T. F. Bowne.
INVENTOR.
Vincent P. Travers
BY Briesen & Steele
ATTORNEYS.

UNITED STATES PATENT OFFICE.

VINCENT P. TRAVERS, OF NEW YORK, N. Y.

HAMMOCK-SPREADER.

SPECIFICATION forming part of Letters Patent No. 381,863, dated April 24, 1888.

Application filed December 12, 1887. Serial No. 257,599. (No model.)

*To all whom it may concern:*

Be it known that I, VINCENT P. TRAVERS, a resident of the city, county, and State of New York, have invented an Improved Hammock-Spreader, of which the following is a specification.

The object of my invention is to provide an improved hammock spreader which may be readily folded so as to take up but little space, and which when extended will have the required strength.

The invention consists in the novel arrangement and combination of parts that are more fully hereinafter set forth.

Reference is to be had to the accompanying drawings, forming part of this specification, in which—

Figure 1 is a perspective view of a hammock provided with my improved spreaders. Fig. 2 is a cross-sectional view of the same. Fig. 3 is a detail view of the hinged part of the spreader, the spreader being shown folded. Fig. 4 is a horizontal longitudinal section on the line $k\ k$, Fig. 5, through the hinged part of the spreader; and Fig. 5 is a cross section on the line $c\ c$, Fig. 4.

In the accompanying drawings, the letter A represents a hammock, which may be of suitable construction and adapted to be supported in any suitable manner.

B is my improved spreader. It is curved and made in two principal parts, marked, respectively, $a$ and $b$. The inner ends of these parts $a\ b$ are preferably beveled and arranged to lap, as shown in Fig. 4. These inner or meeting ends of the parts $a\ b$ are pivoted by pins $d$ in a peculiar skeleton tube, D. The tube D is composed of two longitudinal straps, $e\ e$, which carry the pivots $d$, and which are connected at their ends by semicircular pieces $f$. Near their centers the straps $e$ are connected by another semicircular piece, $g$. The semicircles $f$ and $g$ extend in opposite directions from the straps $e$, as shown, thus forming a tube-like cavity for the reception of the parts $a\ b$ of the spreader. The spreader B may be secured to the hammock in any suitable manner, but preferably by passing the outer cords of the hammock through the holes near the ends of the spreader.

To the semicircle $g$ of the tube D is secured a cord, $h$, the opposite end of which is to be secured to the loop $i$ on the end of the hammock, or to any other suitable support. For the easy connection of the rope $h$ with its support, I provide said rope with a hook, $j$, as shown, which hook may readily enter the loop $i$.

In Fig. 3 my improved spreader is shown as being folded ready for transportation. In extending this spreader I first turn the part $b$ on its pivot from the position shown in Fig. 3 in full lines to that shown in said figure in dotted lines and in Fig. 4 in full lines. I now turn the part $a$ on its pivot until its inner end strikes the inner end of the part $b$, as shown clearly in Fig. 4. The spreader will now be fully extended, as shown in Figs. 1 and 2. When the spreader is extended and in position in a hammock, as shown in Fig. 1, the rope $h$ is to be secured to its proper support. The rope $h$ acts to keep the spreader from slipping inward along the body of the hammock.

When the spreader is to be folded, the part $a$ is first turned on its pivot from the extended position shown by dotted lines in Fig. 3 to that shown by full lines. The part $b$ is then turned in a like manner. The meeting edges of the parts $a\ b$ prevent said parts swinging too far on their pivots when the spreader is extended, and its parts bear on the semicircles $f$ and $g$.

With this construction the spreader may be readily folded and extended, and when extended will be strong and durable.

Although I have shown but one joint in the spreader, more than one such joint may be used, if preferred.

Having now described my invention, what I claim is—

1. The spreader B, composed of separate parts $a\ b$, combined with the skeleton tube D, within which the ends of the parts $a\ b$ of the spreader are pivoted, substantially as described.

2. The spreader B, composed of separate parts $a\ b$, said parts having beveled meeting ends, combined with the skeleton tube D, within which said parts $a\ b$ are pivoted, substantially as described.

3. The spreader B, composed of the parts $a\ b$, having beveled ends, combined with the skeleton tube D, having straps *e e*, semicircular piece *g*, and semicircular pieces *f f*, the parts *a b* being pivoted in said straps so that their ends may abut, substantially as described.

4. The combination of the hammock A, two-part spreader B, skeleton tube D, within which the parts of the spreader are pivoted, and the rope *h*, carried by the tube D, all arranged for operation substantially as herein shown and described.

VINCENT P. TRAVERS.

Witnesses:
T. F. BOURNE,
HARRY M. TURK.